A. Vail.
Wheel Plow.
No. 81,571. Patented Aug. 25, 1868.
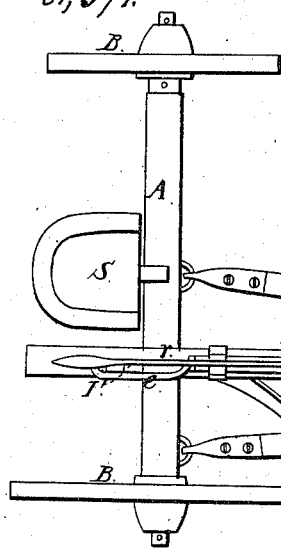
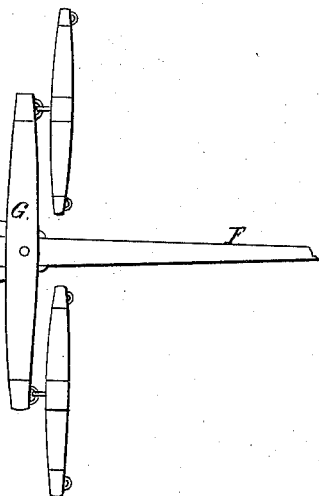
Fig. 1.
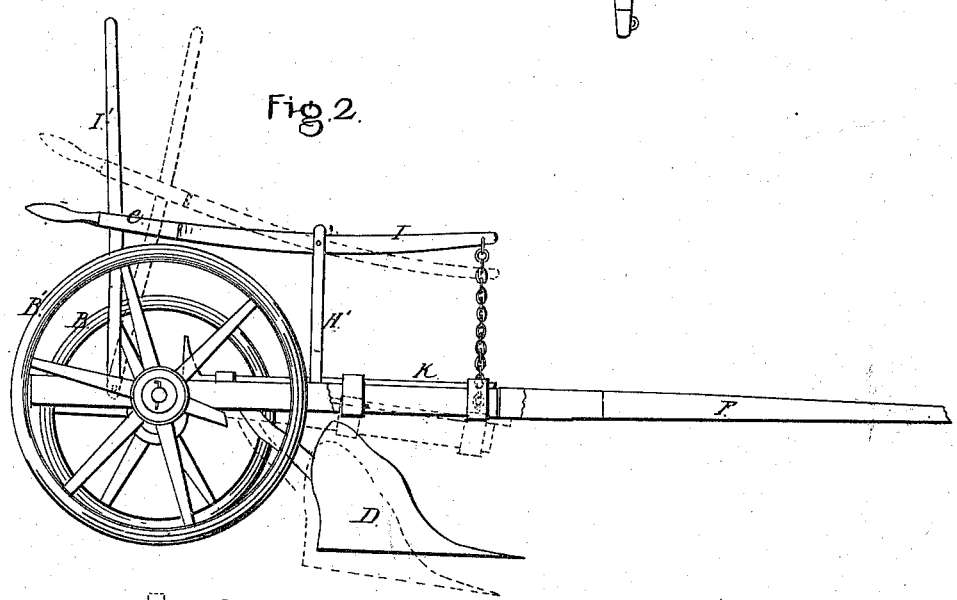
Fig. 2.
Fig. 3.
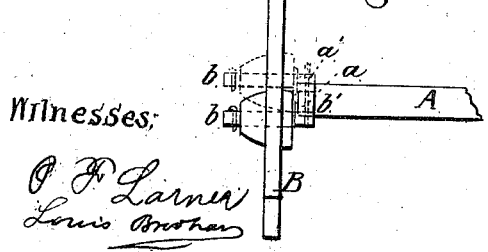
Witnesses:
Inventor:
Alex Vail
By Wiedersheim & Co.
Attys

United States Patent Office.

ALEXANDER VAIL, OF HENRY, ILLINOIS.

Letters Patent No. 81,571, dated August 25, 1868.

IMPROVEMENT IN PLOWS.

*The Schedule referred to in these Letters Patent and making part of the same.*

TO ALL WHOM IT MAY CONCERN:

Be it known that I, ALEXANDER VAIL, of Henry, in the county of Marshall, and State of Illinois, have invented a new and useful Improvement in Plows; and I do hereby declare the following to be a full, clear, and exact description of the same, sufficient to enable others skilled in the art to which my invention appertains to fully understand and use the same, reference being had to the accompanying drawings, making part of this specification, in which—

Figure 1 is a top or plan view of a plow illustrating my invention.
Figure 2 is a side elevation, illustrative of the operation.
Figures 3, 4, and 5 are detail views hereinafter to be referred to.
Similar letters of reference indicate corresponding parts in the two figures.

My invention relates to a two-horse riding-plow, and is more particularly designed as an "old-ground" plow, it being made controllable by means hereinafter fully specified.

In the drawings—

A represents an axle-tree, which is supported upon two wheels, B B', and to said axle-tree is fastened a beam, C, which may be made laterally adjustable by wedges or otherwise, to enable the plow to take more or less land. To this beam C the shank of the plow, D, is rigidly fastened, so that the plow partakes of all the movements of the beam. A driver's seat, S, is so mounted as to be somewhat behind the axle-tree A, thereby counterbalancing the plow. Two hounds, E E', are hinged to the front part of the axle-tree, and form at their other ends a point of attachment for the tongue, F, to which the double-tree G is fastened. These hounds support two upright arms H H', joined together at top, and serving as a fulcrum for a lever, I, whose forward end is connected by a rod or chain to the forward end of the beam C, while the other end is operated by the driver. A slide, K, is fitted to work upon the top of the beam C, which slide, when the forward end of the beam C is lowered, (by means of the lever I,) is pushed forward, to maintain the relative positions of the beam and tongue, without the necessity of sustaining the lever I by hand. The beam C may have a guide-wheel fastened to its front end, which precedes the plow, and secures a uniform depth of the furrow.

The wheel B', that runs in the furrow, is about one foot larger in diameter than that on the land-side, which keeps the plow in a level position.

When the plow runs too deep, or meets an obstruction, the driver, by pulling back the slide K, can lift it immediately out of the ground by his own weight, the seat being so situated as to apply the necessary leverage.

The lever I is also used for keeping the plow raised as long as the plowing is to be suspended.

The vertical guide-rod I', rising from the rear end of the beam C, is embraced by a loop, e, on the lever I, and it may be provided with a series of apertures, to enable the lever to be retained in any desired position, by a spring-detent.

In order to maintain the horizontal position of the axle, &c., when the machine is travelling over a level road, as well as when one wheel is in the furrow and the other upon the "land," I provide the smaller wheel B with adjustable journal b, (see fig. 3,) formed with or upon a socket-piece, b', which receives a stud, a, projecting from the end of the axle. A pin, a', serves to key the socket-piece b' to the stud a, and thus retain the journal b in either the elevated or depressed position shown in fig. 3, (by red lines and blue tint, respectively,) according as the machine is at work or passing over level ground.

Having thus described my invention, what I claim as new herein, and desire to secure by Letters Patent, is—

1. The beam C, supporting the plow D, and rigidly secured to the axle A, in combination with the driver's seat S, the hinged hounds E E', and tongue F, substantially as and for the purpose herein set forth.

2. The slide K, arranged to operate in connection with the beam, hounds, and tongue, substantially as and for the purpose described.

3. The hinged hounds E E', in combination with a plow suspended from a beam, rigidly secured to the axle, substantially as described.

4. The combination of the beam C, plow D, hinged hounds E E', tongue F, lever I, axle A, and driver's seat S, substantially as and for the purpose described.

ALEXANDER VAIL.

Witnesses:
WM. MOLES,
F. WHITE.